Patented Nov. 22, 1938

2,137,240

UNITED STATES PATENT OFFICE 2,137,240

HORMONAL COMPOSITION

Joseph S. De Frates, New Brunswick, N. J., assignor to E. R. Squibb & Sons, New York, N. Y., a corporation of New York No Drawing. Application May 16, 1935, Serial No. 21,833

13 Claims. (Cl. 167—74)

This invention relates to and has for its object the provision of a composition having the gonadotropic activity of the sex hormone of the anterior lobe of the pituitary gland in that when administered to hypophysectomized animals it is follicle-stimulating in the female and gametogenic in the male.

In the practice of this invention, the urine of women having defunct ovaries, particularly of castrate and menopausic women, is subject to a process comprising essentially the step of precipitating with an excess of a water-miscible neutral organic solvent, especially alcohol or acetone, or with a water-insoluble alcohol-soluble adsorbent, such as stearic acid or benzoic acid. Further treatment—as precipitation with ammonium sulphate, extraction with alkali, and fractionation with a solvent, and also dialysis and isoelectric precipitation—are desirable for purifying the product. The composition thus obtained, when administered to hypophysectomized animals, exhibits the gonadotropic activity of the sex hormone of the anterior lobe of the pituitary gland, being follicle-stimulating in the female and gametogenic in the male.

As an example, some ammonium sulphate and an excess of alcohol may be added to castrate or menopausic urine, water is added to the precipitate formed to give a concentrated solution of the ammonium sulphate, the precipitate is extracted with alkali, and the extract (preferably, but not necessarily, after intermediate salting out with ammonium sulphate, and dialysis and isoelectric precipitation) is fractionated with alcohol.

As a further example, stearic acid dissolved in a small volume of hot alcohol, is poured slowly into castrate or menopausic urine previously adjusted to a pH of between 4 and 5; the stearic acid precipitates out, carrying with it the active principle; and addition of enough alcohol to dissolve the stearic acid, leaves the active principle as a precipitate.

Other processes that may be employed comprise steps such as: (1) treating the urine with alcohol at 80% concentration, dissolving the precipitate in water, and reprecipitating with ammonium sulphate; (2) adding to the urine 1% of ammonium sulphate and then alcohol to a concentration of 80%; (3) adding to the urine 15% of ammonium sulphate and then alcohol to a concentration of 80%; (4) concentrating the urine, adding 1% of ammonium sulphate, and precipitating with alcohol; (5) saturating the urine with ammonium sulphate, extracting the precipitate with 0.1 N sodium hydroxide, and saturating the extract with ammonium sulphate; (6) adding to the urine 8% of ammonium sulphate and alcohol to a concentration of 85%, removing excess ammonium sulphate by dialysis, precipitating isoelectrically, and precipitating from the isoelectric mother liquor with acetone; (7) adding to the urine 8% of ammonium sulphate and alcohol to a concentration of 85%, removing excess ammonium sulphate by dialysis, precipitating isoelectrically, adding alcohol to the isoelectric mother liquor to a concentration of 40%, removing any precipitate by centrifuging, increasing the alcohol concentration to 85%, removing the precipitate by centrifuging, drying it, and dissolving in 90% glycerin.

Detailed example

More specifically, 15 gallons (56.5 liters) of castrate urine may have its pH, if greater than 6.5, adjusted to approximately that point by means of glacial acetic acid; and to it (in a 100-gallon crock) is added 4 kg. (a sub-precipitating amount) of ammonium sulphate and, after thorough mixing, ethyl alcohol (95%) until it constitutes approximately 83% of the mixture. Introduction of ammonium sulphate at this stage facilitates subsequent filtering and dispenses with (tedious) aqueous extraction of the alcohol precipitate. After the mixture has stood overnight, the supernatant alcohol is pumped off, and the precipitate, containing the active principle with practically all the ammonium sulphate, is filtered by suction, washed with about 8 liters of 95% alcohol, dried with about 3 liters of ether, and exposed to the atmosphere overnight.

To the weighted dry precipitate, enough water (normally between 6 liters and 6300 cc.) is added to make a saturated solution of ammonium sulphate (the volume of water in cc. may be roughly calculated by dividing 0.7 into the weight of the precipitate in grams). After thorough stirring, the fine light precipitate, which contains the active principle, is filtered off by suction, suspended in about 1 liter of 95% alcohol (in a large mortar), refiltered, washed with about 1 liter of 95% alcohol, and dried with 1 liter of ether.

At this point the precipitates from several batches are combined and thoroughly mixed. Portions (usually about 500 g.) representing 200 liters of castrate urine and weighed, and extracted overnight in the refrigerator with weak alkali, consisting of 5 liters of distilled water and 400 cc. of normal sodium hydroxide, the mixture being then alkaline to litmus but not to phenolphthalein. Next the somewhat cloudy supernatant fluid is decanted and 20 g. of kieselguhr is added thereto and an equal amount is added to the residue, and each is filtered separately by suction. The clear amber filtrates, which contain the active principle, are combined and made neutral to litmus by means of (about 25 cc. of) concentrated hydrochloric acid.

Now the active principle is salted out from the extract by adding solid ammonium sulphate to the saturation point (the volume of the extract, with washings, being about 5500 cc., and 300 g. of ammonium sulphate having been present in the initial 500 g. of precipitate, the amount of ammonium sulphate to be added is calculated as 3550 g., by subtracting 300 from the product of 5500 and 0.7). The mixture is kept in the refrigerator four hours and filtered there overnight by gravity on hardened filter papers; and the precipitate is suspended in about 2 liters of 95% alcohol, filtered off by suction, washed with 1 liter of alcohol, and dried with 1 liter of ether. All of the precipitate except about 30 g. being ammonium sulphate, enough water (0.7 divided into the grams of precipitate exceeding 30) is added to make the solution saturated with respect to the salt, and after thorough mixing in a mortar, filtration is effected by suction, and the precipitate is suspended in 500 cc. of 95% alcohol, refiltered by suction, washed with 500 cc. of alcohol, and dried with 500 cc. of ether.

To remove the last traces of ammonium sulphate, a portion (usually between 6 and 7 g.) of the precipitate representing 40 liters of the castrate urine is mixed with 100 cc. of water and dialyzed in Cellophane sacs against running tap water, 16 hours generally sufficing to eliminate the ammonium sulphate, as indicated by a negative Nessler reaction. The combined solutions from three sacs (about 475 cc.) are treated with (about 4.5 to 5 cc. of) normal hydrochloric acid until the pH is approximately 3.5, the bulky isoelectric precipitate obtained is centrifuged out, and the clear supernatant fluid, which contains the active principle, is made neutral to litmus by the addition of normal sodium hydroxide. Whatever active principle has been carried down with the isoelectric precipitate may be recovered by dissolving the latter in about 300 cc. of weak alkali and reprecipitating with hydrochloric acid at pH 3.5. The second solution is neutralized and combined with the first, and the total volume, if less than 800 cc., is increased thereto with distilled water.

Most of the blood-pressure-reducing substances present in the extract may be removed by fractionation with alcohol, accomplished by cooling the solution in an ice-water bath, treating with 600 cc. of cold 95% alcohol, and adding dropwise to the slightly turbid mixture enough glacial acetic acid (about 2 cc.) to cause the formation of a heavy flocculent precipitate. To the supernatant fluid, which may be slightly clouded, is added 200 cc. of alcohol, so that the alcohol concentration is about 50%. Some active principle may be recovered from the precipitate by dissolving it in very dilute alkali to a volume of 400 cc. and reprecipitating as before. To the supernatant solution obtained by this step, 100 cc. of alcohol is added. The two solutions are combined, and their slight turbidity is removed by adding kieselguhr and filtering by suction. The clear pale yellow 50% alcohol extract is now poured into 8 liters of acetone, and the mixture is stirred well and kept in the refrigerator overnight. The fine white precipitate formed, which contains the active principle, is centrifuged off, suspended in acetone, filtered by suction, washed with acetone and with ether, and dried in a vacuum desiccator over phosphorus pentoxide.

The product so obtained forms in 90% glycerin a stable solution, which may be diluted with distilled water for hypodermic administration.

It is to be understood that the foregoing examples are merely illustrative and by no means limitative of the invention, which may be variously otherwise embodied—as with respect to source material, precipitants, solvents, reactants, and procedures—within the scope of the appended claims.

I claim:

1. In the obtainment from the urine of women having defunct ovaries of a composition exhibiting the gonadotropic activity of the sex hormone of the anterior lobe of the pituitary gland in that when administered to hypophysectomized animals it is follicle-stimulating in the female and gametogenic in the male—the steps of adding to said urine a sub-precipitating amount of ammonium sulfate and then a precipitating amount of a water-miscible neutral organic solvent, separating the precipitate, adding thereto sufficient water to make a substantially saturated solution of ammonium sulfate, and recovering the undissolved material.

2. In the obtainment from the urine of women having defunct ovaries of a composition exhibiting the gonadotropic activity of the sex hormone of the anterior lobe of the pituitary gland in that when administered to hypophysectomized animals it is follicle-stimulating in the female and gametogenic in the male—the steps of adding to said urine a sub-precipitating amount of ammonium sulfate and then a precipitating amount of alcohol, separating the precipitate, adding thereto sufficient water to make a substantially saturated solution of ammonium sulfate, and recovering the undissolved material.

3. In the obtainment from the urine of women having defunct ovaries of a composition exhibiting the gonadotropic activity of the sex hormone of the anterior lobe of the pituitary gland in that when administered to hypophysectomized animals it is follicle-stimulating in the female and gametogenic in the male—the steps of adjusting the pH of the urine to approximately 6.5 by means of acetic acid, adding a sub-precipitating amount of ammonium sulfate and then a precipitating amount of a water-miscible neutral organic solvent, separating the precipitate, adding thereto sufficient water to make a substantially saturated solution of ammonium sulfate, and recovering the undissolved material.

4. The process of purifying the composition obtained from the urine of women having defunct ovaries and exhibiting the gonadotropic activity of the sex hormone of the anterior lobe of the pituitary gland in that when administered to hypophysectomized animals it is follicle-stimulating in the female and gametogenic in the male, which comprises adding a water-miscible neutral organic solvent to an aqueous solution of the composition until a concentration of about 50% is attained, separating the precipitate, and increasing the concentration of water-miscible neutral organic solvent to precipitate the desired composition.

5. The process of purifying the composition obtained from the urine of women having defunct ovaries and exhibiting the gonadotropic activity of the sex hormone of the anterior lobe of the pituitary gland in that when administered to hypophysectomized animals it is follicle-stimulating in the female and gametogenic in the male, which comprises adding a water-miscible neutral organic solvent to an acetic-acid-containing aqueous solution of the composition until a concentration of about 50% is attained, separating the precipitate, and increasing the concentration of water-miscible neutral organic solvent to precipitate the desired composition.

6. The process of purifying the composition obtained from the urine of women having defunct ovaries and exhibiting the gonadotropic activity of the sex hormone of the anterior lobe of the pituitary gland in that when administered to hypophysectomized animals it is follicle-stimulating in the female and gametogenic in the male, which comprises adding alcohol to an acetic-acid-containing aqueous solution of the composition until a concentration of about 50% is attained, separating the precipitate, and increasing the concentration of water-miscible neutral organic solvent to precipitate the desired composition.

7. The process of purifying the composition obtained from the urine of women having defunct ovaries and exhibiting the gonadotropic activity of the sex hormone of the anterior lobe of the pituitary gland in that when administered to hypophysectomized animals it is follicle-stimulating in the female and gametogenic in the male, which comprises adding alcohol to an acetic-acid-containing aqueous solution of the composition until a concentration of about 50% is attained, separating the precipitate, and adding acetone to precipitate the desired composition.

8. In the obtainment from the urine of women having defunct ovaries of a composition exhibiting the gonadotropic activity of the sex hormone of the anterior lobe of the pituitary gland in that when administered to hypophysectomized animals it is follicle-stimulating in the female and gametogenic in the male—the steps of adding to the said urine a sub-precipitating amount of ammonium sulfate and then a precipitating amount of a water-miscible neutral organic solvent, separating the precipitate, adding thereto sufficient water to make a substantially saturated solution of ammonium sulfate, extracting the undissolved material with a weak alkali, adding a water-miscible neutral organic solvent until a concentration of about 50% is obtained, separating the precipitate, and increasing the concentration of water-miscible neutral organic solvent to precipitate the desired composition.

9. The therapeutically effective composition obtained by the process of claim 4.

10. The therapeutically effective composition obtained by the process of claim 5.

11. The therapeutically effective composition obtained by the process of claim 6.

12. The therapeutically effective composition obtained by the process of claim 7.

13. The therapeutically effective composition obtained by the process of claim 8.

JOSEPH S. DE FRATES.